United States Patent
Kunz

(10) Patent No.: US 6,227,427 B1
(45) Date of Patent: May 8, 2001

(54) VERTICALLY ADJUSTABLE MEANS FOR SECURING A GOLF BAG TO A HORIZONTAL SUPPORT

(76) Inventor: John H. Kunz, 22610 Las Brizas, Sun City West, AZ (US) 85375

( * ) Notice: Subject to any disclaimer, the term of this patent is extended or adjusted under 35 U.S.C. 154(b) by 0 days.

(21) Appl. No.: 09/346,972

(22) Filed: Jul. 2, 1999

(51) Int. Cl.[7] .................................................. B60R 7/00
(52) U.S. Cl. ...................... 224/547; 224/42.4; 224/274; 224/552; 224/570; 206/315.3; 206/315.7
(58) Field of Search ................................. 224/42.4, 274, 224/545, 547, 548, 552, 567, 570; 206/315.3, 315.2, 315.7, 315.8

(56) References Cited

U.S. PATENT DOCUMENTS

| | | |
|---|---|---|
| D. 316,779 | 5/1991 | Henrickson et al. . |
| 2,405,674 | 8/1946 | Schliwa et al. . |
| 2,575,930 | 11/1951 | Schwartz . |
| 2,626,815 | 1/1953 | Chamberlin . |
| 2,679,402 | 5/1954 | Sawyer et al. . |
| 3,465,993 | 9/1969 | Muehlhausen . |
| 4,355,746 | 10/1982 | Casady . |
| 4,373,234 | 2/1983 | Boden . |
| 4,768,650 | 9/1988 | Chancellor, Jr. . |
| 4,944,434 * | 7/1990 | Hamilton ........................... 224/552 X |
| 5,029,883 | 7/1991 | Derito . |
| 5,123,531 | 6/1992 | Beretta . |
| 5,127,564 * | 7/1992 | Romero ............................ 224/570 X |
| 5,472,251 | 12/1995 | Deininger . |
| 5,586,674 | 12/1996 | Nachbauer . |
| 5,671,842 | 9/1997 | Jaworski . |
| 5,816,462 * | 10/1998 | Brantley ............................... 224/570 |

FOREIGN PATENT DOCUMENTS

WO 97/45311    12/1997    (WO) .

* cited by examiner

*Primary Examiner*—Stephen K. Cronin
(74) *Attorney, Agent, or Firm*—Charles E. Cates; Elizabeth A. Dawn

(57) ABSTRACT

The golf bag holder of the present invention includes a vertically adjustable clamp which is mounted to a horizontal support member. The clamp is provided with a vertical slot for insertion of a bolt. The bolt is inserted through the slot in the clamp, through a bore in the horizontal support member, and then is threadedly engaged with a nut. When a golf bag is placed adjacent to the horizontal support member, the clamp is lowered onto the lip of the golf bag. Once properly positioned, the clamp is fixed in place by tightening the nut on the bolt.

13 Claims, 3 Drawing Sheets

VERTICALLY ADJUSTABLE MEANS FOR SECURING A GOLF BAG TO A HORIZONTAL SUPPORT

This invention relates to a means for releasably securing golf bags to the horizontal support member commonly located on the rear of golf carts.

BACKGROUND OF THE INVENTION

Motorized golf carts are commonly equipped with a low deck area on the back of the cart where golf bags may be placed. A rigid horizontal support member for securing golf bags to the golf cart is commonly provided on the rear of the golf cart. The horizontal support is typically arcuate in shape. Flexible straps for securing golf bags are attached towards the center of the horizontal support. A buckle for securing the straps is located at the distal ends of the support. A buckle of the type commonly used to secure golf bags to golf bag holders is described in U.S. Pat. No. 4,373,234 to Boden. Golf bags are secured to the golf cart by positioning the golf bags adjacent to the horizontal support member and then wrapping a flexible strap around each of the bags. The strap is pulled tight across each of the bags and is secured by the buckle.

Although the flexible strap and buckle means described above does hold golf bags in position while the golf cart is in motion, every time a golf bag is released from the cart, the buckle must be released and the flexible strap unthreaded from the buckle. Similarly, when the golf bag is loaded onto the back of the golf cart, the securing strap must be brought across the golf bag, threaded through the buckle, pulled taut so as to secure the bag in a fixed position, and then the buckle must be closed on the strap. All these steps require some effort on the part of the golfer and take up time. Moreover, a person with limited mobility in his hands and fingers, such as can be caused by arthritis, may be unable to thread the strap through the buckle and then close the buckle on the strap to secure the golf bag.

Various hook means for securing a golf bag to a carrier that is pushed or pulled by the golfer have been considered. U.S. Pat. No. 2,626,815 to Chamberlin, U.S. Pat. No. 2,575,930 to Schwartz, and U.S. Pat. No. 2,679,402 to Sawyer teach rolling golf bag carriers in which the golf bag is secured to the carrier, at least in part, by a hook extending over the upper lip of the golf bag. U.S. Pat. No. 2,405,674 to Schliwa et al. teaches an assembly of adjustable plates and brackets for securing the upper lip of the golf bag to a carrier.

There is a need for a more efficient and effective means of attaching golf bags to motorized golf carts. Although the patents discussed above teach means for attaching a golf bag to a carrier, it is desirable to a have a means for attaching golf bags to motorized golf carts which can be retrofitted and used with original equipment.

SUMMARY OF THE INVENTION

The golf bag holder of the present invention, which can be easily retrofitted to the horizontal support member commonly provided on the rear of a motorized golf cart comprises a vertically adjustable J-shaped clamp adapted to be mounted to the horizontal support member. The clamp is provided with a vertical slot for insertion of a bolt. The bolt is inserted through the slot in the clamp, a bore in the horizontal support member that registers with the slot, and then is threadedly engaged with a nut provided with a handle. When a golf bag is placed adjacent to the horizontal support member, the clamp is lowered onto the lip of the golf bag by means of the slot traveling on the bolt. Once properly positioned, the clamp is held in place by tightening the nut on the bolt. To release the bag, the golfer need only loosen the nut on the blot and move the clamp out of the way.

DETAILED DESCRIPTION OF THE DRAWINGS

Figure 1:
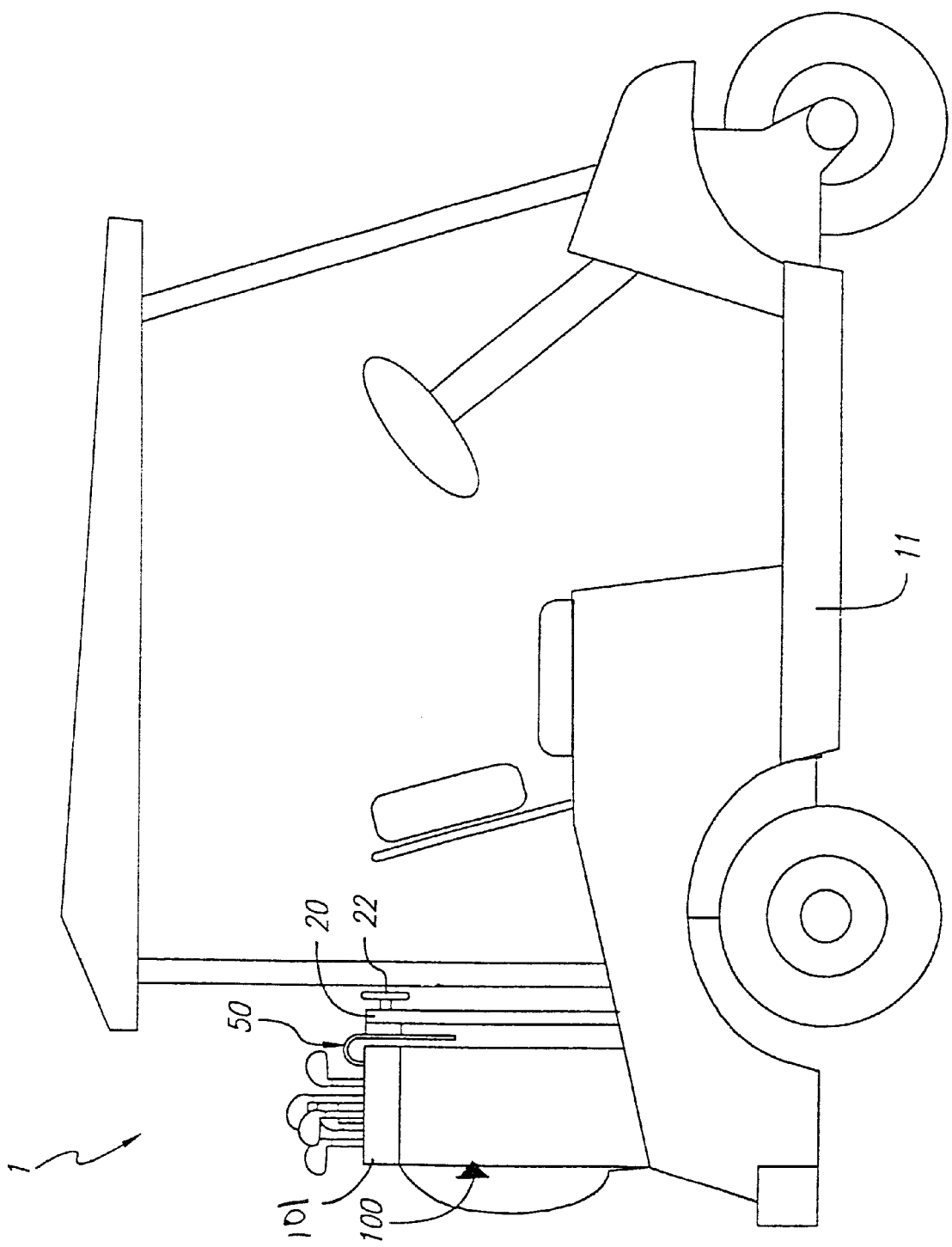
FIG. 1 is a side view showing the horizontal support member on a golf cart.
Figure 2:
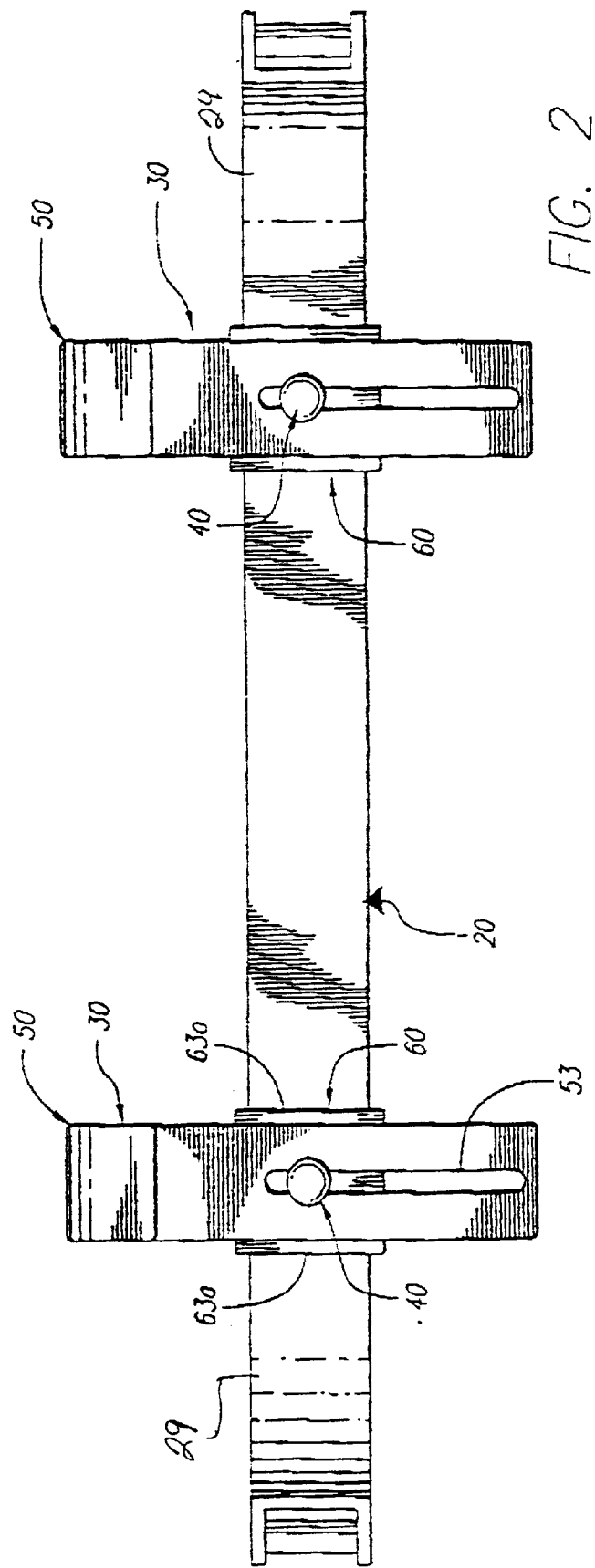
FIG. 2 is a front view of the golf bag holder.

As shown in FIGS. 1 and 2, the golf bag holder 1 of the present invention includes horizontal support member 20 for supporting a golf bag. Horizontal support member 20 includes arms 29 extending outward from either side of the midpoint. Clamping means 30 is adjustably mounted to one or both of arms 29.

As shown in FIGS. 1 and 2, horizontal support member 20 is conventionally mounted on the rear of a golf cart. Horizontal support 20 includes arms 29. It is preferred that the each of arms 29 be turned slightly inward at their distal ends creating a curvature in which a golf bag 100 may rest. Each of support arms 29 is further provided with bore 22 for mounting of clamping means 30.

Figure 3:
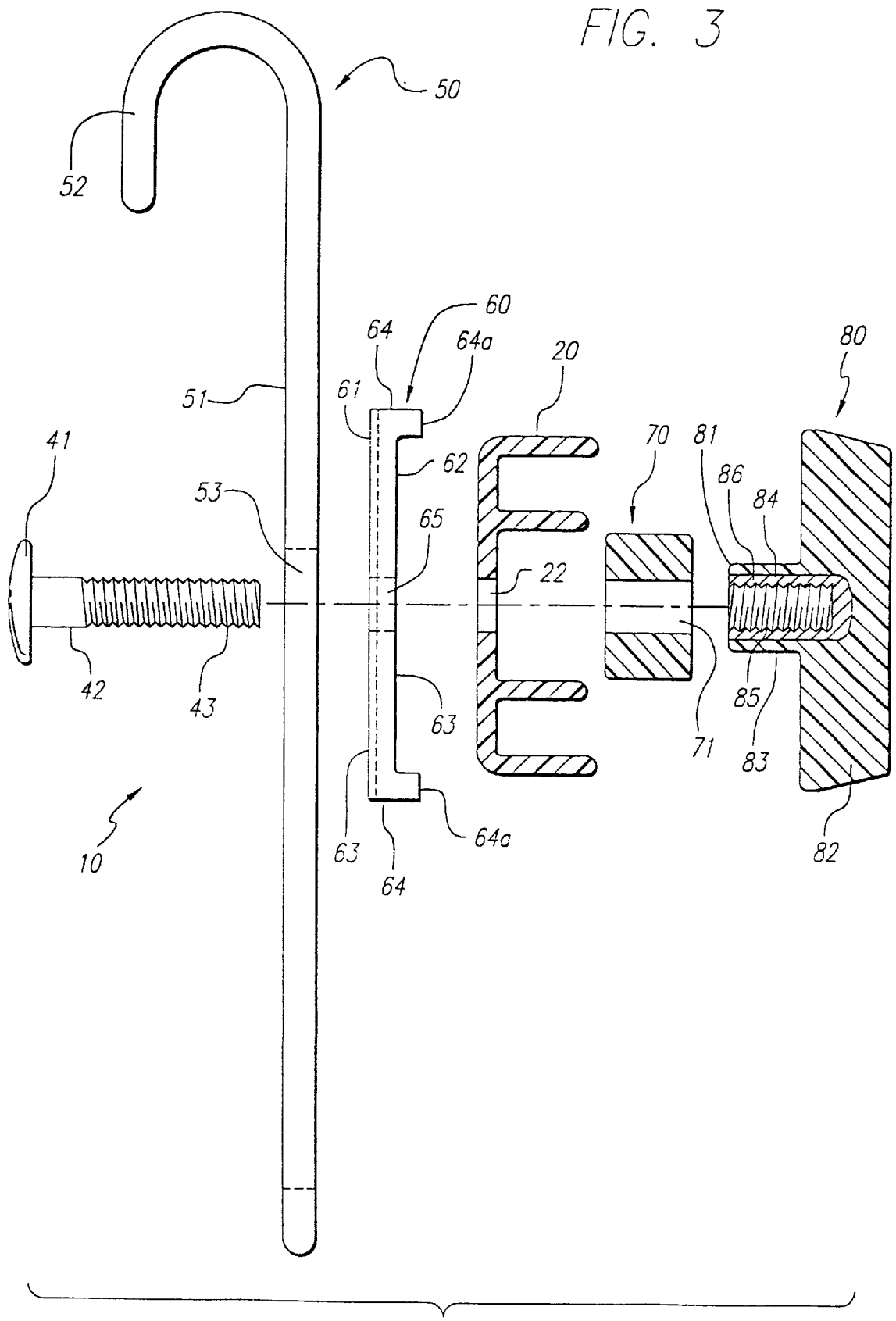
FIG. 3 is an exploded side view of the clamping means.

As shown best in FIGS. 2 and 3, clamping means 30 is mounted on each of support arms 29. Clamping means 30 includes bolt 40, clamp 50, guide 60, spacer 70 and handle 80.

Bolt 40 includes flattened head 41, and cylindrical body portion 42 which terminates with threaded region 43.

Clamp 50 is in the shape of an inverted J and includes flat, rectangular body portion 51 and curved neck region 52. Body portion 51 of clamp 50 is further provided with slot 53 which allows clamp 50 to slide up and down on bolt 40.

Guide 60 is generally rectangular in shape having two long sides 63 and two short sides 64. Guide 60 has a front side 61 for contacting clamp 50 and a rear side 62 for contacting support arms 29. As shown best in FIG. 2, in the front of guide 60, raised vertical guide rails 63A are provided on each of the long sides. As it is preferred that the clamping means 30 of the present invention not be horizontally moveable, guide rails 63A are provided to guide the vertical movement of clamp 50. Guide rails 63A should be spaced apart so that clamp 50 may slide up and down between guide rails 63A. On the rear side of guide 60, as shown in FIG. 3, raised horizontal rails 64A are provided along each of the short sides 64 of the guide. Rails 64A function to stabilize clamping means 30 on support arms 29. Rails 64A should be spaced apart so that support arms 29 passes between rails 64A. Guide 60 is further provided with bore 65 for receiving bolt 40.

Clamping means 30 optionally includes spacer 70. Spacer 70 is generally in the shape of a cube. Spacer 70 is provided with bore 71 for receiving bolt 40.

Handle 80 has a generally cylindrically shaped main body 81 which is provided with gripping means 82. Gripping means 82 passes through the main body and extends outwardly a distance from the main body. Main body 81 includes an exterior surface 83 and an interior surface 84 having a nut 86 with threads 85 which are adapted for threaded engagement with the threads on the threaded region 43 of bolt 40. Nut 86 should have a diameter and length such that threads 85 readily engage with threaded region 43 of bolt 40.

To mount clamping means 30 on support arms 29, bolt 40 passes through slot 53 on clamp 50, through bore 65 on guide 60, through bore 22 on support arms 29, through bore 71 on spacer 70 and then is threadedly engaged with threads 85 on nut 86 in knob 80.

In use, the clamping means 30 is mounted to one or both of support arms 29. Golf bag 100 is positioned adjacent to horizontal support member 20. Clamp 50 is then lowered onto lip 101 of golf bag 100 by means of the slot 53 traveling on bolt 40. Thus, the golf bag is secured to the support member. Once clamp 50 is in the desired position, handle 80 is turned in a clockwise direction such that threads 85 on nut 86 engage threaded region 43 of bolt 40. As nut 86 is tightened onto bolt 40, head region 41 is pulled against clamp 50, securing the clamp in the desired position. To remove golf bag 100 from the support arms 29, handle 80 is turned in a counter-clockwise direction, loosening nut 86 on bolt 40. When head region 41 is no longer held against clamp 50, slot 53 permits clamp 50 to slide up and down on bolt 40.

In an alternate embodiment of the invention (not shown) the bolt is provided with a handle. In this embodiment, the blot extends through the clamp and support and is then received by a stationary nut.

What is claimed is:

1. In combination with a golf cart having a floor and a fixed, horizontal support disposed above said floor, adjustable means for carrying a golf bag on said cart, comprising:
    a. a vertically adjustable clamp for engaging the lip of said golf bag; and
    b. means for attaching said vertically adjustable clamp to said horizontal support and fixing the vertical position of said clamp.

2. The adjustable means of claim 1 wherein a guide is provided for said clamp such that the horizontal movement of said clamp is limited.

3. The adjustable means of claim 1 wherein said vertically adjustable clamp is provided with a vertical slot.

4. The adjustable means of claim 3 wherein a guide is provided for said clamp such that the horizontal movement of said clamp is limited.

5. The adjustable means of claim 1 wherein the means for attaching said vertically adjustable clamp to said horizontal support and fixing the vertical position of said clamp comprises a bolt affixed to said support and extending through said vertical slot.

6. The device of claim 5 wherein said bolt is secured by a nut.

7. The adjustable means of claim 5 wherein a guide is provided for said clamp such that the horizontal movement of said clamp is limited.

8. The device of claim 5 wherein said support is provided with a slot to receive said bolt and said bolt passes through said slots in said support and clamp and is secured by a nut.

9. The adjustable means of claim 8 wherein a guide is provided for said clamp such that the horizontal movement of said clamp is limited.

10. An adjustable means for securing a golf bag to a rigid horizontal support comprising a vertically adjustable clamp for engaging the lip of said golf bag, said vertically adjustable clamp being provided with a vertical slot, said vertically adjustable clamp being secured to said horizontal support by a bolt extending through said vertical slot and said horizontal support and received by a nut, said vertically adjustable clamp being fixed in a given vertical position by turning said nut into engagement with said bolt.

11. An adjustable means for securing a golf bag to a rigid horizontal support, said adjustable means comprising:
    a. a vertically adjustable clamp provided with a vertical slot for engaging the lip of said golf bag;
    b. means for attaching said vertically adjustable clamp to said horizontal support comprising a bolt extending through said vertical slot and means for engaging said horizontal support; and
    c. means for fixing the vertical position of said vertically adjustable clamp.

12. The adjustable means of claim 11 further comprising a nut to receive said bolt.

13. The adjustable means of claim 11 wherein a guide is provided for said clamp such that the horizontal movement of said clamp is limited.

* * * * *